United States Patent [19]

Kometani et al.

[11] 4,146,532

[45] Mar. 27, 1979

[54] FLUOROELASTOMER COMPOSITION WITH DIAZOBICYCLOUNDECENIUM

[75] Inventors: Yutaka Kometani, Toyonaka; Shinichi Nakagawa, Osaka; Takeshi Suzuki, Nagaokakyo; Yasuyoshi Furukawa, Neyagawa; Tsuneo Nakagawa, Ibaraki; Masayasu Tomoda; Masahiko Oka, both of Takatsuki; Tutomu Terada, Toyonaka; Yutaka Ueta, Ibaraki, all of Japan

[73] Assignee: Daikin Kogyo Co., Ltd., Osaka, Japan

[21] Appl. No.: 791,219

[22] Filed: Apr. 27, 1977

Related U.S. Application Data

[63] Continuation-in-part of Ser. No. 597,685, Jul. 21, 1975, abandoned.

[30] Foreign Application Priority Data

Jul. 20, 1974 [JP] Japan .................................. 49-83607

[51] Int. Cl.$^2$ ........................... C08F 8/34; C08F 8/40; C08F 2/38; C08J 3/24
[52] U.S. Cl. ......................................... 526/18; 526/50; 526/207; 526/229; 526/233; 526/247; 526/254
[58] Field of Search ............... 260/47 UP; 526/18, 50, 526/207, 253, 254, 249

[56] References Cited

U.S. PATENT DOCUMENTS

| | | | |
|---|---|---|---|
| 3,707,529 | 12/1972 | Gladding | 526/254 |
| 3,845,024 | 10/1974 | Weaver | 526/254 |
| 3,857,807 | 12/1974 | Kometani | 260/29.6 F |
| 3,951,913 | 4/1976 | Kometani | 260/47 UA |

*Primary Examiner*—C. A. Henderson
*Attorney, Agent, or Firm*—Armstrong, Nikaido, Marmelstein & Kubovcik

[57] ABSTRACT

A fluoroelastomer composition comprising (a) a fluoroelastomer having stabilized end group derived from an isoparaffin selected from the group consisting of isobutane, isopentane and isohexane, (b) at least one member selected from the group consisting of bivalent metal oxides, bivalent metal hydroxides and mixtures of bivalent metal oxide or metal hydroxide with metal salt of weak acid, (c) an aromatic polyhydroxy compound and (d) a quaternary ammonium compound of 8-alkyl- (or 8-aralkyl-)1,8-diazabicyclo[5.4.0]-7-undecenium, provides a fluoro-rubber having low compression set and excellent elastic properties and has excellent processing and storage properties. The fluoroelastomer can be cured with appropriate induction time and fast cure rate by the use of a specific curing agent system mentioned above.

13 Claims, No Drawings

FLUOROELASTOMER COMPOSITION WITH DIAZOBICYCLOUNDECENIUM

CROSS-REFERENCE TO RELATED APPLICATION

This application is a continuation-in-part of applicants' copending application Ser. No. 597,685 filed on July 21, 1975 and now abandoned.

BACKGROUND OF THE INVENTION

The present invention relates to a novel fluoroelastomer composition, and more particularly to a fluoroelastomer composition containing a fluoroelastomer having stabilized end group which can be cured with an appropriate induction time and a satisfactory fast cure rate by the use of a specific curing agent system.

Fluoroelastomer, for instance, elastomeric copolymers of vinylidene fluoride and other copolymerizable fluorine-containing monomers, such as vinylidene fluoridehexafluoropropene copolymer and vinylidene fluoride-hexafluoropropene-tetrafluoroethylene terpolymer, are well known in the art. These fluoroelastomer can be cured by using a diamine or an organic peroxide, or a combination of an aromatic polyhydroxy compound and an appropriate accelerator, and their vulcanizates, namely fluoro-rubbers, have excellent resistances to heat, oils, solvents and chemical reagents. In general, from the viewpoint of an economical advantage on manufacture, they have prepared by inorganic free-radical catalyzed polymerization of the monomers in an aqueous medium, for instance, employing an initiator comprising an inorganic peroxide such as ammonium persulfate. The inorganic free-radical initiator gives a polymer having ionic end groups such as —COOH and —OSO$_3$H, or their salts.

The proportion of ionic end groups in the polymer is reduced when the inorganic free-radical catalyzed polymerization is carried out in the presence of an isoparaffin. This process provides fluoroelastomers having ionic end groups mentioned above and nonionic end groups derived from the isoparaffin. For instance, when isopentane is employed as the isoparaffin, it is assumed that the nonionic end groups are, for example, such as —H and —C(CH$_3$)$_2$CH$_2$CH$_3$. The fluoroelastomers so prepared have good processing characteristics and provide vulcanizates with excellent compression set properties. However, such fluoroelastomers have certain disadvantages. Thus, for instance, when such fluoroelastomers are cured by using a diamine curing agent which has been the most widely employed in the art, the cure rate is slow and, therefore, the curing time is long.

OBJECTS OF THE INVENTION

It is an object of the present invention to provide a novel fluoroelastomer composition which can be cured with an appropriate induction time and a satisfactory fast cure rate.

A further object of the invention is to provide a fluoroelastomer composition which can be cured to provide a fluoro-rubber having a low compression set and excellent elastic properties.

A still further object of the invention is to provide a fluoroelastomer composition having excellent processing and storage properties.

These and other objects of the present invention will become apparent from the description hereinafter.

DESCRIPTION OF THE INVENTION

If has now been found that (a) a fluoroelastomer having stabilized end group derived from an isoparaffin selected from the group consisting of isobutane, isopentane and isohexane can be cured with an appropriate induction time and a fast cure rate by the use of a curing agent system containing (b) at least one member selected from the group consisting of a bivalent metal oxide, a bivalent metal hydroxide and a mixture of a bivalent metal oxide or a bivalent metal hydroxide with a metal salt of a weak acid, (c) an aromatic polyhydroxy compound, and (d) a quaternary ammonium compound having the general formula:

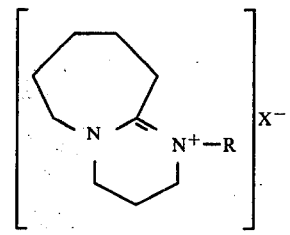

wherein R is an alkyl group having from 1 to 24 carbon atoms or an aralkyl group having from 7 to 20 carbon atoms, and X$^-$ is an anion such as halide ion, hydroxylate ion, alkoxylate ion, carboxylate ion, phenoxide ion, sulfonate ion, sulfate ion, sulfite ion and carbonate ion.

It has also been found that the resulting vulcanizate has a low compression set and excellent elastic properties such as modulus at 100% elongation, tensile strength, elongation and hardness and that the composition of the invention has excellent processing and storage properties.

The fluoroelastomer employed in the present invention as the ingredient (a) is prepared by the polymerization of fluorine-containing monomers in an aqueous medium in the presence of an inorganic free-radical initiator and an isoparaffin selected from the group consisting of isobutane, isopentane and isohexane. The thus prepared fluoroelastomer has ionic end groups derived from the initiator and nonionic end groups derived from the isoparaffin, and is hereinafter referred to as a "fluoroelastomer having stabilized end group".

Some members of the present inventors previously invented a curing composition of a fluoroelastomer using the above ingredients (c) and (d) in the presence of the above ingredient (b), as described in U.S. Pat. No. 3,857,807. The present inventors have now found that, when the fluoroelastomer having stabilized end group is used in combination with the above-mentioned curing agent system, the cure rate can be further accelerated and also the compression set property at high temperature (100° to 200° C.) and processing property in roll-mixing (namely sticking of the fluoroelastomer to the roll surfaces) can be improved.

The fluoroelastomers, which are prepared by the inorganic free-radical catalyzed polymerization with the isoparaffin in an aqueous medium, employed in the present invention are copolymers of vinylidene fluoride and other copolymerizable fluorine-containing monomers. Typical copolymerizable fluorine-containing monomers include trifluoroethylene, tetrafluoroethylene, trifluorochloroethylene, trifluoropropene, hexafluoropropene, pentafluoropropene, vinyl fluoride, perfluoro methyl perfluoro vinyl ether, and the like. The fluoroelastomers containing a small amount of a monomer unit such as vinyl compound, olefin, diene or an α,β-ethylenically unsaturated carboxylic acid may also be usable in the present invention. Vinylidene fluoride-hexafluoropropene copolymer and vinylidene fluoride-tetrafluoroethylene-hexafluoropropene terpolymer exhibit excellent elastic properties and thermal stability and are preferably employed in the invention.

The fluoroelastomers having stabilized end group employed in the invention are prepared by copolymerizing vinylidene fluoride and the copolymerizable fluorine-containing monomer(s) in an aqueous medium in the presence of an inorganic free-radical initiator and an appropriate amount of the isoparaffin in a known process. The polymerization reaction is carried out in a pressure-resisting reactor, usually at a temperature of 30° to 150° C. and under a pressure of 5 to 50 kg./cm²G. The polymerization conditions are determined according to the kinds and amounts of the initiator and the isoparaffin. As the inorganic free-radical initiator, water-soluble inorganic peroxides such as sodium, potassium or ammonium persulfates, perphosphates, perborates or percarbonates, or hydrogen peroxide are employed in the polymerization. These initiators can be further activated by reducing agents such as sodium, potassium or ammonium sulfite, bisulfite, metabisulfite, hyposulfite, thiosulfite, phosphite or hypophosphite. However, when the fluoroelastomer having stabilized end group prepared by using the inorganic peroxide in combination with the reducing agent is employed as the ingredient (a), the cure rate of the composition cannot be much improved. Therefore, the fluoroelastomers having stabilized end group prepared by using the inorganic peroxide as the initiator without the reducing agent are preferably employed in the invention. The isoparaffin which can be used to produce the nonionic end groups in the polymer chain is generally isobutane, isopentane or isohexane. The free-radical initiator should be employed in an amount of at least 0.01% by weight to water, and an amount not less than 0.1% by weight to water is desirable for causing the polymerization reaction to proceed at an economical rate. The amount of the isoparaffin is determined according to the kind and amount of initiator, and an amount sufficient to produce the intended fluoroelastomer having stabilized end group is employed.

The fluoroelastomers having stabilized end group suitably employed in the present invention are those having a ratio of noniontic ends to all ends in the polymer chain of 5 to 85%. If the cure rate of the composition as well as the economical polymerization rate of the fluoroelastomer, the processing property of the composition and the elastic properties of the resulting fluoro-rubber are comprehensively taken into consideration, fluoroelastomers having the ratio of 5 to 30% are preferably employed in the invention. The ratio is hereinafter referred to as an "end group stabilization ratio". The end group stabilization ratio $\phi$ (%) is calculated as follows: In an aqueous polymerization system containing certain concentrations of isoparaffin and free-radical initiator, if f represents the efficiency of the initiator, Np represents the number of the formed polymer chain and [I] represents the amount of decomposed inorganic free-radical initiator (mole), the number of the nonionic end group in the formed polymer chain is $2Np - 2f \times$ [I] (mole) and the number of all end groups is $2Np$ (mole). Thus, the end group stabilization ratio is:

$$\frac{Np - f \times [I]}{Np} \times 100$$

When the end group-stabilized fluoroelastomer having an end group stabilization ratio of less than 5% is employed, the properties of such a fluoroelastomer are similar to those of a fluoroelastomer prepared in the absence of the isoparaffin and, therefore, further improvement of the low compression set and processing property is not expected. Also, the end group-stabilized fluoroelastomer having an end group stabilizaton ratio of more than 85% is prepared with difficulty. Further, in the present invention, fluoroelastomers having an intrinsic viscosity of from 0.4 to 1.0 are employed. The intrinsic viscosity $[\eta]$ as used herein is measured at 35° C., employing methyl ethyl ketone as a solvent.

Suitable examples of the ingredient (b) employed in the present invention are bivalent metal oxides such as MgO, CaO, PbO, or ZnO, bivalent metal hydroxides such as $Mg(OH)_2$, $Ca(OH)_2$, $Pb(OH)_2$ or $Zn(OH)_2$, and mixtures of the above metal oxides and/or metal hydroxides with metal salts which are formed from metals such as Ba, K, Pb and Ca and weak acids such as stearic acid, benzoic acid, carbonic acid, oxalic acid and phosphorous acid.

Examples of the ingredient (c) which are aromatic polyhydroxy compounds are 2,2-bis(4-hydroxyphenyl)-propane [Bisphenol A], 2,2-bis(4-hydroxyphenyl)perfluoropropane [Bisphenol AF], resorcinol, 1,3,5-trihydroxybenzene, 1,7-dihydroxynaphthalene,2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane [Bisphenol B], 4,4-bis(4-hydroxyphenyl)pentanoic acid, 2,2-bis(4-hydroxyphenyl)-tetrafluorodichloropropane, 4,4'-dihydroxydiphenyl sulfone, 4,4'-dihydroxydiphenyl ketone, tri(4-hydroxyphenyl)methane, 3,3',5,5'-tetrachloro-bisphenol A, 3,3',5,5'-tetrabromobisphenol A, and the like. The preferred aromatic polyhydroxy compounds are hydroquinone, Bisphenol A and Bisphenol AF. Alkali metal salts or alkaline earth metal salts of the above-mentioned aromatic polyhydroxy compounds may also be employed in the invention.

Examples of the ingredient (d) which are quaternary ammonium compounds are 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0 -7-undecenium methylsulfate, 8-ethyl-1,8-diaza-bicylo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride, 8-(3-phenylpropyl)-1,8-diaza-bicyclo[5.4.0]-7-undecenium chloride, and the like.

As the amount of the above ingredients per 100 parts by weight of the fluorelastomer having stabilized end group, 2 to 30 parts, preferably 5 to 20 parts by weight of the ingredient (b), 0.5 to 5 parts, preferably 1 to 2 parts by weight of the ingredient (c) and 0.2 to 10 parts, preferably 0.3 to 3 parts by weight of the ingredient (d) are respectively employed. If the amount of the ingredient (d) is less than the above range, the cure of the fluoroelastomer composition tends to occur unsatisfactory. On the other hand, if the amount of ingredient (d) is greater than the above range, the elastic properties of the resulting fluoro-rubber are liable to be reduced.

In the present invention, a filler such as carbon black, silica, clay, diatomaceous earth or talc may be further added to the composition of the invention if needed. If necessary, a small amount of a conventional curing agent may be added to the composition of the invention. Moreover, a plasticizer or colorant may also be added.

The fluoroelastomer composition so obtained can be cured by a conventional process. For instance, the composition is milled by mixing rolls, and the resulting compounds are put into a mold and cured under pressure and then the resulting article is removed from the mold followed by curing in an oven. In general, the press cure is carried out at a temperature of 100° to 200° C. under a pressure of 20 to 100 kg./cm$^2$G for a period of 10 to 180 minutes, and the oven cure is carried out at a temperature of 150° to 300° C. for a period of 0 to 30 hours. Other curing processes may be used for instance, a process in which the cure is carried out after pre-molding such as injection moding or extrusion molding; alternatively, a process may be carried out in which a coating composition prepared by dissolving or dispersing the fluorelastomer composition in a solvent such as a ketone, e.g. methyl ethyl ketone, acetone or cyclohexanone, an ether, e.g. methyl ethyl ether, diethyl ether, dioxane or tetrahydrofuran, or a mixture thereof, is applied on a surface of paper, fiber, film, sheet, board, tube, pipe, tank, a large vessel or any other shaped articles (made from a cellulose derivative, synthetic resin, metal or others) and then cured.

The present invention is more particularly described and explained by means of the following illustrative Examples, in which all parts are by weight unless otherwise described.

In order to illustrate the preparation of the fluoroelastomer having stabilized end group and of the fluoroelastomer prepared in the absence of the isoparaffin, the following Reference Examples are also presented.

REFERENCE EXAMPLE 1

A 36.6 liter autoclave was charged with 15 liters of demineralized and deoxidized water. After thoroughly replacing air within the autoclave with pure nitrogen gas, 1,100 g. of a monomer mixture consisting of 65% by mole of vinylidene fluoride and 35% by mole of hexafluoropropene was supplied into the autoclave. The temperature was elevated to 80° C. with agitation, and to initiate polymerization, 0.24 g. of isopentane and 100 ml. of an aqueous solution containing 25.6 g. of ammonium persulfate were supplied into the autoclave by nitrogen pressure. At the same time, a previously prepared aqueous solution of ammonium persulfate in a concentration of 161 g./liter was supplied into the autoclave at a rate of 1 ml./minute, which corresponded to the amount of decomposed ammonium persulfate, so that the undecomposed ammonium persulfate concentration was maintained at a constant concentration. Isopentane was also supplied into the autoclave at a rate of 0.0046 g./minute, which corresponded to the amount of consumed isopentane, so as to maintain the concentration of unreacted isopentane constant. Since the pressure dropped with the progress of the polymerization, a monomer mixture consisting of 78% by mole of vinylidene fluoride and 22% by mole of hexafluoropropene was supplied to the autoclave to maintain the pressure at 12 kg./cm.$^2$G during the polymerization.

After 185 minutes from the initiation, heating and agitation were stopped and the monomers remaining in the autoclave were removed to terminate the polymerization reaction. From the aqueous dispersion so prepared, 4,760 g. of the copolymer was recovered. The number average molecular weight of the copolymer was 70,000 which was measured by the osmotic pressure method. The Mooney viscosity ($ML_{1+20}$) and the intrinsic viscosity [$\eta$] of the copolymer were 20 and 0.66, respectively.

The end group stabilization ratio, which was calculated on the basis of the equation mentioned before, was 42.2%. In calculation, the number of the formed polymer chain Np was obtained by dividing the amount of formed polymer by the number average molecular weight, and the total amount of decomposed initiator [I] was obtained by the first-order reaction rate equation wherein the decomposition rate constant for ammonium persulfate at 80° C. was 0.0087 min.$^{-1}$. Also, a value of 0.3 was applied as the efficiency of initiator f. By the present inventors, it was confirmed from a great number of experiments that the value of 0.3 was adequate under conditions in the instant Reference Example.

REFERENCE EXAMPLE 2

A 36.6 liter autoclave was charged with 15 liters of demineralized and deoxidized water. After thoroughly replacing air within the autoclave with pure nitrogen gas, 750 g. of a monomer mixture consisting of 65% by mole of vinylidene fluoride and 35% by mole of hexafluoropropene was supplied into the autoclave. The temperature was elevated to 80° C. with agitation, and to initiate polymerization 100 ml. of an aqueous solution containing 52.7 g. of ammonium persulfate was supplied into the autoclave by nitrogen pressure. At the same time, a previously prepared aqueous solution of ammonium persulfate in a concentration of 267 g./liter was supplied into the autoclave at a rate of 1 ml./minute, which corresponded to the amount of decomposed ammonium persulfate, so that the undecomposed ammonium persulfated concentration was maintained at a constant concentration. Since the pressure dropped with the progress of the polymerization, a monomer mixture consisting of 78% by mole of vinylidene fluoride and 22% by mole of hexafluoropropene was supplied into the autoclave to maintain the pressure at 8 kg./cm$^2$G during the polymerization.

After 142 minutes from the initiation of polymerization, heating and agitation were stopped and the monomers remaining in the autoclave were removed to terminate the polymerization reaction. From the aqueous dispersion so prepared, 4,210 g. of the copolymer was recovered. The number average molecular weight of the copolymer was 75,000 which was measured by the osmotic pressure method. The Mooney viscosity ($ML_{1+20}$) and the intrinsic viscosity [$\eta$] of the copolymer were 22 and 0.78, respectively. The end group stabilization ratio of the copolymer so prepared was defined as 0%.

EXAMPLES 1 TO 6 AND COMPARATIVE EXAMPLES 1 TO 8

The fluoroelastomer having stabilized end group, which was previously prepared in Reference Example 1 or in accordance with Reference Example 1, was milled by mixing rolls at room temperature, while adding medium thermal carbon, magnesium oxide, calcium hydroxide, hydroquinone and 8-benzyl-1,8-diaza-bicyclo[5.4.0]-7-undecenium chloride in each amount shown in the following Table (Examples 1 to 6), in that order. The mixture was further milled by mixing rolls at room temperature and allowed to stand overnight to give a composition.

After milling again, the composition was put into molds and cured at a temperature of 170° C. under a pressure of 55 kg./cm.$^2$G for a period of 30 minutes to form a sheet and a block. After taking out the formed articles from the mold, the articles were cured in an oven at a temperature of 230° C. for a period of 24 hours.

Modulus at 100% elongation, tensile strength, elongation and hardness of the obtained fluoro-rubber sheet and compression set of the obtained fluoro-rubber block were measured. Also, curing test of the composition was carried out at a temperature shown in the Table by using a curelasto meter (JSR-Curelasto Meter No. II Type put on sale from Japan Synthetic Rubber Co., Ltd.) and from the obtained curing curve, minimum viscosity, extent of cure, induction time, proper curing time and cure rate were estimated.

The results are shown in the Table.

Also, the results of Comparative Examples 1 to 8, which were carried out by using compositions shown in the Table in the same manner as in the Examples, are shown in the Table.

The fluoroelastomer having stabilized end group (end group stabilization ratio: 42.2%) employed in Example 1 and the fluoroelastomer (end group stabilization ratio: 0%) employed in Comparative Example 1 are that prepared in Reference Example 1 and that prepared in Reference Example 2, respectively. Also, fluoroelastomers prepared in accordance with Reference Examples 1 and 2 are employed in the other Examples and Comparative Examples.

| | Example 1 | Example 2 | Com. Ex. 1 | Example 3 |
|---|---|---|---|---|
| Fluoroelastomer | | | | |
| Isoparaffin | Isopentane | Isopentane | — | Isopentane |
| Kind* | Copolymer | Copolymer | Copolymer | Copolymer |
| End group-stabilization ratio (%) | 42.2 | 68.0 | 0 | 75.0 |
| Mooney viscosity (at 140° c.) | 20 | 21 | 22 | 26 |
| Composition | | | | |
| Fluoroelastomer | 100 | 100 | 100 | 100 |
| Medium thermal carbon | 20 | 20 | 20 | 20 |
| Magnesium oxide | 3 | 3 | 3 | 3 |
| Calcium hydroxide | 6 | 6 | 6 | 6 |
| Hydroquinone | 1.0 | 1.0 | 1.0 | — |
| Bispenol AF | — | — | — | 2.0 |
| N,N'-dicinnamylidene-1,6-hexanediamine | — | — | — | — |
| 8-Benzyl-1,8-diaza-bicyclo[5.4.0]-7-undecenium chloride | 0.40 | 0.40 | 0.40 | 0.35 |
| Curing test | | | | |
| Temperature (° C.) | 170 | 170 | 170 | 170 |
| Minimum viscosity (kg.) | 0.18 | 0.16 | 0.17 | 0.26 |
| Extend of cure (kg.) | 2.00 | 2.65 | 2.08 | 4.44 |
| Induction time (minute) | 5.7 | 5.5 | 7.2 | 5.5 |
| Proper curing time (minute) | 11.7 | 8.8 | 13.0 | 7.8 |
| Cure rate (minute) | 6.0 | 3.3 | 5.8 | 2.3 |
| Properties of fluoro-rubber | | | | |
| Modulus at 100 % elongation (kg./cm$^2$.) | 56 | 75 | 74 | 47 |
| Tensile strength (kg./cm$^2$.) | 135 | 130 | 149 | 130 |
| Elongation (%) | 200 | 150 | 150 | 190 |
| Hardness | 66 | 71 | 71 | 70 |
| Compression set | | | | |
| 23° C. × 24 hours (%) | 7 | 6 | 7 | 7 |
| 200° C. × 24 hours (%) | 6 | 7 | 9 | 7 |

| | Example 4 | Com. Ex. 2 | Com. Ex. 3 | Com. Ex. 4 |
|---|---|---|---|---|
| Fluoroelastomer | | | | |
| Isoparaffin | Isopentane | — | Isopentane | — |
| Kind* | Terpolymer | Terpolymer | Terpolymer | Terpolymer |
| End group-stabilization ratio (%) | 50.0 | 0 | 50.0 | 0 |
| Mooney viscosity (at 140° C.) | 43 | 54 | 43 | 43 |
| Composition | | | | |
| Fluoroelastomer | 100 | 100 | 100 | 100 |
| Medium thermal carbon | 20 | 20 | 20 | 20 |
| Magnesium oxide | 3 | 3 | 3 | 3 |
| Calcium hydroxide | 6 | 6 | — | — |
| Hydroquinone | 1.2 | 1.2 | — | — |
| Bispenol AF | — | — | — | — |
| N,N'-dicinnamylidene-1,6-hexanediamine | — | — | 3 | 3 |
| Hexamethylenediamine carbamate | — | — | — | — |
| 8-Benzyl-1,8-diaza-bicyclo[5.4.0]-7-undecenium chloride | 0.55 | 0.55 | — | — |
| Curing test | | | | |
| Temperature (° C.) | 180 | 180 | 160 | 160 |
| Minimum viscosity (kg.) | 0.46 | 0.56 | 0.41 | 0.42 |
| Extent of cure (kg.) | 3.48 | 3.29 | 2.04 | 2.35 |
| Induction time (minute) | 4.0 | 8.9 | 3.2 | 2.35 |
| Proper curing time (minute) | 7.0 | 13.8 | 45.0 | 35.0 |
| Cure rate (minute) | 3.0 | 4.9 | 42.0 | 31.5 |
| Properties of fluoro-rubber | | | | |
| Modulus at 100 % elongation (kg./cm$^2$.) | 65 | 74 | 32 | 47 |
| Tensile strenbgth (kg./cm$^2$.) | 149 | 173 | 145 | 187 |
| Elongation (%) | 180 | 190 | 320 | 280 |
| Hardness | 69 | 75 | 70 | 72 |
| Compression set | | | | |
| 23° C. × 24 hours (%) | 7 | 8 | 37 | 34 |
| 200° C. × 24 hours (%) | 9 | 14 | 32 | 34 |

-continued

|  | Example 5 | Example 6 | Com. Ex. 5 | Com. Ex. 6 | Com. Ex. 7 | Com. Ex. 8 |
|---|---|---|---|---|---|---|
| Fluoroelastomer |  |  |  |  |  |  |
| Isoparaffin | Isopentane | Isopentane | — | — | Isopentane | Isopentane |
| Kind* | Copolymer | Copolymer | Copolymer | Copolymer | Copolymer | Copolymer |
| End group-stablization ratio (%) | 9.1 | 10.6 | 0 | 0 | 9.1 | 10.6 |
| Mooney viscosity (at 140° c.) | 28 | 30 | 10 | 44 | 28 | 30 |
| Composition |  |  |  |  |  |  |
| Fluoroelastomer | 100 | 100 | 100 | 100 | 100 | 100 |
| Medium thermal carbon | 20 | 20 | 20 | 20 | 20 | 20 |
| Magnesium oxide | 3 | 3 | 3 | 15 | 15 | 15 |
| Calcium hydroxide | 6 | 6 | 6 | — | — | — |
| Hydroquinone | — | — | — | — | — | — |
| Bisphenol AF | 2.0 | 2.0 | 2.0 | — | — | — |
| N,N'-dicinnamylidene-1,6-hexanediamine | — | — | — | — | — | — |
| Hexamethylenediamine carbamate | — | — | — | 1.5 | 1.5 | 1.5 |
| 8-Benzyl-1,8-diaza-bicyclo[5.4.0]-7-undecenium chloride | 0.35 | 0.35 | 0.35 | — | — | — |
| Curing test |  |  |  |  |  |  |
| Temperature (° C.) | 170 | 170 | 170 | 150 | 150 | 150 |
| Minimum viscosity (kg.) | 0.28 | 0.30 | 0.09 | 0.64 | 0.42 | 0.45 |
| Extent of cure (kg.) | 4.19 | 4.20 | 3.89 | 4.46 | 3.80 | 3.94 |
| Induction time (minute) | 5.6 | 5.7 | 3.5 | 1.6 | 2.0 | 1.9 |
| Proper curing time (minute) | 9.3 | 9.7 | 9.1 | 14.4 | 14.0 | 13.4 |
| Cure rate (minute) | 3.7 | 4.0 | 5.6 | 12.8 | 12.0 | 11.5 |
| Properties of fluoro-rubber |  |  |  |  |  |  |
| Modulus at 100 % elongation (kg./cm².) | 50 | 51 | 69 | 53 | 45 | 44 |
| Tensile strength (kg./cm².) | 131 | 125 | 149 | 169 | 169 | 160 |
| Elongation (%) | 190 | 180 | 160 | 190 | 210 | 210 |
| Hardness | 74 | 74 | 76 | 76 | 76 |  |
| Compression set |  |  |  |  |  |  |
| 23° C. × 24 hours (%) | — | — | — | — | — | — |
| 200° C. × 24 hours (%) | 9** | 8** | 12** | 33*** | 34*** | 34*** |

*Copolymer means vinylidene fluoride-hexafluoropropene copolymer. Terpolymer means vinylidene fluoride-hexafluoropropene-tetrafluoroethylene terpolymer.
** Samples used in measurement are those cured at 170° C. under 55 kg./cm². G for 20 minutes and then cured in an oven at 230° C. for 24 hours.
***Samples used in measurement are those cured at 150° C. under 55 kg./cm². G for 20 minutes and then cured in an oven at 200° C. for 24 hours.

NOTE:
1. Curing test is carried out by employing a test sample having a size of 34 mm. × 7 mm. × 2 mm. The test sample is put into a mold chamber and tested under the conditions of temperature shown in the Table, frequency of 6 c./min. and amplitude of 3°. A curing curve is prepared from the stresses measured with the elapse of time, and therefrom minimum viscosity (kg.), extent of cure (kg.), induction time (min.), proper curing time (min.) and cure rate (min.) are obtained.

The induction time is the period of time which elapses until the extent of cure reaches 10%.

The proper curing time is the period of time which elapses until the extent of cure reaches 90%.

The cure rate is shown by the balance between the proper curing time and the induction time.

2. Modulus at 100% elongation (kg./cm²), tensile strength (kg./cm²) and elongation (%) are measured with dumbbell test pieces (No. 3) prepared from the samples of cured sheet by using a universal tensile tester (UTM-III type) made by Toyo Sokki Kabushiki Kaisha according to the provision of Japanese Industrial Standard (JIS) K 6301 (corresponds to ASTM D 412-68).

3. Hardness is measured by using a hardness tester (Asker J. type) made by Kobunshi Keiki Kabushiki Kaisha.

4. Compression set is measured with test disk samples prepared from samples of cured block, according to the provision of JIS K 6301, as follows: The test samples are kept at 23° C. and 200° C. under a compression of 25% for 24 hours, and then allowed to stand at room temperature for 30 minutes for measurement with a thickness gauge for rubber of Peacock type made by Kabushiki Kaisha Ozaki Seisakusho. Compression set is calculated on the basis of a thickness of sample according to the following equation:

$$\text{Compression set (\%)} = \frac{t_0 - t_1}{t_0 - t_2} \times 100$$

wherein $t_0$ is thickness (mm.) before compression, $t_1$ is thickness (mm.) after compression and $t_2$ is thickness (mm.) of spacer.

As is clear from the results shown in the Table, the cure rate of Examples 1 to 3 are superior to those of Comparative Example 1 employing the fluoroelastomer prepared in the absence of the isoparaffin. In addition to the cure rate, the compression set property is also further improved as compared with Comparative Example 1.

It is clear from the comparison between the results of Example 4 and Comparative Example 2 that the end group-stabilized terpolymer also shows better results in cure rate and compression set property than the terpolymer prepared in the absence of the isoparaffin.

Further, it is clear from the results of Comparative Examples 3 and 4 that the fluoroelastomer having stabilized end group is cured with slow rate. This will be understood from the fact that the cure rate thereof is worse than that of the fluoroelastomer prepared in the absence of the isoparaffin when the usual diamine curing agent is employed, and also that the cure is insufficient. Thus, for instance, the values of the modulus at 100% elongation and the tensile strength are small and the value of elongation is large.

Therefore, it will be noted that the disadvantage of the fluoroelastomer having stabilized end group in its cure rate can be overcome by the use of the specific curing agent system, and that the composition of the present invention has improved, excellent cure rate, processing property and storage property and provides fluoro-rubbers having improved, excellent compression set and elastic properties.

What we claim is:

1. In a fluoroelastomer composition comprising (a) a fluoroelastomeric copolymer of vinylidene fluoride and at least one other copolymerizable fluorine-containing monomer prepared by copolymerizing vinylidene fluoride and said other copolymerizable fluorine-containing monomer in an aqueous medium in the presence of an inorganic free-radical initiator selected from the group consisting of sodium, potassium or ammonium persulfates, perphosphates, perborates and percarbonates and hydrogen peroxide in the presence of an isoparaffin selected from the group consisting of isobutane, isopentane and isohexane, (b) at least one member selected from the group consisting of bivalent metal oxides, bivalent metal hydroxides and mixtures of a bivalent metal oxide or a bivalent metal hydroxide with a metal salt of a weak acid, (c) an aromatic polyhydroxy compound and (d) a quaternary ammonium compound having the following general formula:

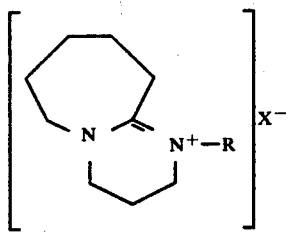

wherein R is an alkyl group having from 1 to 24 carbon atoms or an aralkyl group having from 7 to 20 carbon atoms, and $X^-$ is an anion selected from the group consisting of a halide ion, hydroxylate ion, alkoxylate ion, carboxylate ion, phenoxide ion, sulfonate ion, sulfate ion, sulfite ion and carbonate ion, the improvement which comprises employing a fluoroelastomer having ionic end groups derived from an inorganic free-radical initiator and nonionic end groups derived from an isoparaffin selected from the group consisting of isobutane, isopentane and isohexane and a ratio of the nonionic end groups to all end groups in the polymer chain of 5 to 85%.

2. The composition of claim 1, wherein said fluoroelastomer having stabilized end groups has an end group stabilization ratio of 5 to 30%.

3. The composition of claim 1, wherein said quaternary ammonium compound is present in an amount of 0.2 to 10 parts by weight per 100 parts by weight of the fluoroelastomer.

4. The composition of claim 1, wherein said quaternary ammonium compound is present in an amount of 0.3 to 3 parts by weight per 100 parts by weight of the fluoroelastomer.

5. The composition of claim 1, wherein said quaternary ammonium compound is a member selected from the group consisting of 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-ethyl-1,8-diaza-bicyclo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0.]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride and 8-(3-phenylpropyl)-1,8-diaza-bicyclo[5.4.0]-7-undecenium chloride.

6. The composition of claim 1, wherein said ingredient (b) is present in an amount of 2 to 30 parts by weight per 100 parts by weight of the fluoroelastomer.

7. The composition of claim 1, wherein said ingredient (b) is present in an amount of 5 to 20 parts by weight per 100 parts by weight of the fluoroelastomer.

8. The composition of claim 1, wherein said aromatic polyhydroxy compound is present in an amount of 0.5 to 5 parts by weight per 100 parts by weight of the fluoroelastomer.

9. The composition of claim 1, wherein said aromatic polyhydroxy compound is present in an amount of 1 to 2 parts by weight per 100 parts by weight of the fluoroelastomer.

10. The composition of claim 1, wherein said aromatic polyhydroxy compound is hydroquinone, 2,2-bis(4-hydroxyphenyl)propane or 2,2-bis(4-hydroxyphenyl)perfluoropropane.

11. The composition of claim 1, wherein said fluoroelastomer is a terpolymer of vinylidene fluoride, tetrafluoroethylene and hexafluoropropene.

12. The composition of claim 1, wherein said fluorine-containing monomer is trifluoroethylene, tetrafluoroethylene, trifluorochloroethylene, trifluoropropene, hexafluoropropene, pentafluoropropene, vinyl fluoride or perfluoro methyl perfluoro vinyl ether.

13. The composition of claim 1, wherein said fluoroelastomer is a copolymer of vinylidene fluoride and hexafluoropropene.

* * * * *